No. 727,276. PATENTED MAY 5, 1903.
T. L. BOYLE.
MOTOR VEHICLE.
APPLICATION FILED NOV. 14, 1902.
NO MODEL.
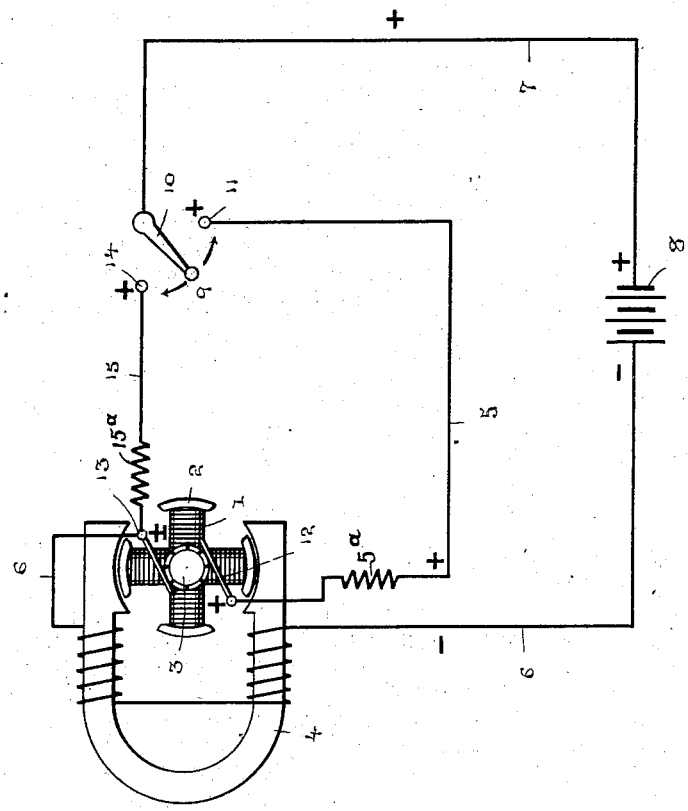
Witnesses
Inventor
Thomas L. Boyle.
By Victor J. Evans
Attorney No. 727,276. Patented May 5, 1903.

UNITED STATES PATENT OFFICE.

THOMAS L. BOYLE, OF OGDEN, UTAH.

MOTOR-VEHICLE.

SPECIFICATION forming part of Letters Patent No. 727,276, dated May 5, 1903.

Application filed November 14, 1902. Serial No. 131,344. (No model.)

*To all whom it may concern:*

Be it known that I, THOMAS L. BOYLE, a citizen of the United States, residing at Ogden, in the county of Weber and State of Utah, have invented new and useful Improvements in Motor-Vehicles, of which the following is a specification.

This invention relates to motor-vehicles, but more particularly to a brake mechanism therefor; and its object is to provide means for cutting out the current supplying the motor and at the same time apply a brake which will retard the movement of the vehicle without the aid of brake-shoes or frictional devices of any kind.

It is of course well known that in electrically-controlled vehicles the current passes through a commutator upon entering the coils of the magnetic field, and without the interposition there would be no rotation of the armature.

The invention consists in providing means hereinafter fully described for preventing the rotation of the armature of a vehicle-motor, thus making the said armature serve as a brake for the vehicle.

In carrying out the purposes of the invention the circuit leading to the commutator can be broken and by means of a supplemental conductor the current can be switched to pass through the magnet instead of the commutator, causing the armature to be attracted by the opposing poles of the magnet, and thus prevent its rotation, so as to bring the vehicle to a standstill.

The accompanying drawing is a diagrammatic view representing an electric motor-circuit provided with a supplemental conductor arranged in accordance with my invention.

The reference-numeral 1 designates the armature of the motor, which is of a common construction and is provided at its arm extremities with segmental curved plates or heads 2.

3 designates the commutator of the motor, and 4 the magnet, which is in proper relative position, the inner faces of the respective poles being curved on a parallel arc with the surface of the plates or shoes.

The motor-circuit is indicated by the lines 5, 6, and 7, which are in communication with a source of energy 8, which may be a storage battery or any other energizing device. The motor-circuit is from the battery 8 through wire 7 to the two-point switch 9, through the switch-lever 10 to contact 11, through wire 5 and resistance $5^a$ to the brush 12, through the commutator to the magnetic field. The current is also carried through the brush 13, bearing on the commutator, thence through wire 6, through the magnet 4, back to battery 8. As long as the switch-lever 10 is on the contact 11 the motor will be driven so as to propel the vehicle. By throwing the lever 10 away from the contact 11 the circuit will be cut out, and by forcing the lever over to the contact 14 a secondary circuit will be cut in through a supplemental conductor 15, which leads from the contact 14 through resistance $15^a$ to the brush 13. This will cause the current to flow from the battery 8 through wire 7 to switch-lever 10, to the supplemental conductor 15, down through the contact of the brush 13, out through the wire 6, around the coils of the magnet 4, and back to battery 8.

Inasmuch as the conductor 5 will not be in circuit with the battery, the current will not be supplied to the armature of the motor, but, on the contrary, the magnet will be energized, so as to attract the plates or heads on the oppositely-disposed arms on the armature, so as to hold them adjacent to the curved portions of the respective poles, whereby the armature will be retarded against rotation, and as the motor will be geared to the wheels of the vehicle it will be apparent that the same can be quickly brought to a standstill. Of course it is appreciated that in the event that the car or vehicle is to be stopped on a downgrade or if it is driven at a high speed the momentum will be sufficient to rotate the armature even after the motor-circuit is broken. However, the magnetic attraction exerted by the magnet 4 upon the ends of the armature will be sufficient to retard the revolution thereof, and the vehicle can be quickly brought under control and stopped by forcing the lever 10 into engagement with the contact 14.

While this invention is primarily intended for vehicles, it is also obvious that it can be used in connection with motors in factories and other like places where it is designed to cut out the motor and stop the line-shafting.

I claim—

The combination of a motor comprising a magnet with inner opposing concaved terminal surfaces, an armature provided with segmental curved plates rotatable between and in close proximity to the said curved surfaces and having a coöperating commutator, brushes 12 and 13 engaging the said commutator, a source of electrical energy having a conductor connected to one terminal thereof and coiled about the poles of the magnet and extending from one of the latter to the other and to the brush 13, a conductor also extending from the opposite terminal of the source of electrical energy and connected to a switch-arm, switch-points with which the switch-arm coöperates, a conductor extending from one of said points through a resistance to the brush 12, and a conductor extending from the other switch-point through a resistance to the brush 13 and connected to the latter at the point where the conductor from one terminal of the source of electrical energy connects.

In testimony whereof I affix my signature in presence of two witnesses.

THOMAS L. BOYLE.

Witnesses:
S. L. IVES,
N. H. IVES.